(12) United States Patent
Mrak et al.

(10) Patent No.: US 8,923,406 B2
(45) Date of Patent: Dec. 30, 2014

(54) VIDEO ENCODING AND DECODING USING TRANSFORMS

(71) Applicant: British Broadcasting Corporation, London (GB)

(72) Inventors: Marta Mrak, London (GB); Andrea Gabriellini, Guilford (GB); Nikola Sprljan, London (GB); David Flynn, Croydon (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 14/070,804

(22) Filed: Nov. 4, 2013

(65) Prior Publication Data
US 2014/0056362 A1 Feb. 27, 2014

Related U.S. Application Data

(63) Continuation of application No. PCT/GB2012/051413, filed on Jun. 19, 2012.

(30) Foreign Application Priority Data

Jun. 27, 2011 (GB) .................................. 1110873.5

(51) Int. Cl.
H04N 7/12 (2006.01)
H04N 19/60 (2014.01)
H04N 19/122 (2014.01)
H04N 19/176 (2014.01)
H04N 19/136 (2014.01)
H04N 19/46 (2014.01)
H04N 19/61 (2014.01)

(52) U.S. Cl.
CPC ... *H04N 19/00775* (2013.01); *H04N 19/00084* (2013.01); *H04N 19/00278* (2013.01); *H04N 19/00139* (2013.01); *H04N 19/00545* (2013.01); *H04N 19/00781* (2013.01)
USPC .................................................... 375/240.18

(58) Field of Classification Search
CPC ................. H04N 19/00775; H04N 19/00781; H04N 19/00884; H04N 19/00545; H04N 19/00278; H04N 19/00084; H04N 19/00139
USPC .................. 375/240, 240.01, 240.03, 240.12, 375/240.18; 382/239, 240
See application file for complete search history.

(56) References Cited

U.S. PATENT DOCUMENTS

2003/0152280 A1* 8/2003 Kadowaki et al. ............ 382/240
2006/0126955 A1* 6/2006 Srinivasan .................... 382/239
2011/0280302 A1* 11/2011 Alshina et al. ........... 375/240.03

FOREIGN PATENT DOCUMENTS

KR 1020050026318 9/2003
WO 98/47061 10/1998
WO 02/28109 4/2002

OTHER PUBLICATIONS

Fatih Kamisli et al.; "Video Compression with 1-D Directional Transforms in H.264/AVC"; IEEE International Conference on Acoustics Speech and Signal Processing (ICASSP), 2010, IEEE, Piscataway, NJ, USA; Mar. 14, 2010, pp. 738-741.

(Continued)

*Primary Examiner* — Allen Wong
(74) *Attorney, Agent, or Firm* — Michael Best & Friedrich LLP

(57) ABSTRACT

Video encoding or decoding utilizing a spatial transform operating on rows and columns of a block, with a set of transform skip modes including: transform on rows and columns; transform on rows only; transform on columns only; no transform. An indication of the selected mode is provided to the decoder. Coefficients are scaled by a factor dependent upon the norm of the transform vector of the skipped transform to bring the untransformed image values to the same level as transformed coefficients.

17 Claims, 4 Drawing Sheets

(56) References Cited

OTHER PUBLICATIONS

Marta Mrak et al.; "Transform skip mode," 7. JCT-VC Meeting; 98. MPEG Meeting; Geneva; (Joint Collaborative Team on Video Coding of ISO/IEC JTC1/SC29/WG11 and ITU-T SG.16); No. JCTVC-G575, Nov. 8, 2011.

Matthias Narroschke et al.; "Extending H.264/AVC by an adaptive coding of the prediction error," 25; Picture Coding Symposium; Apr. 24-26, 2006; Beijing, Apr. 24, 2006.

Yumi Sohn et al.; "One Dimensional Transform for H.264 Based Intra Coding (Abstract)"; 26; Picture Coding Symposium; Nov. 7-9, 2007; LISBON.

International Patent Application No. PCT/GB2012/051413 International Search Report and Written Opinion of the International Searching Authority, dated Jan. 4, 2013 (16 pages).

United Kingdom Patent Application No. GB 1110873.5 Search Report, dated Oct. 5, 2011 (1 page).

\* cited by examiner

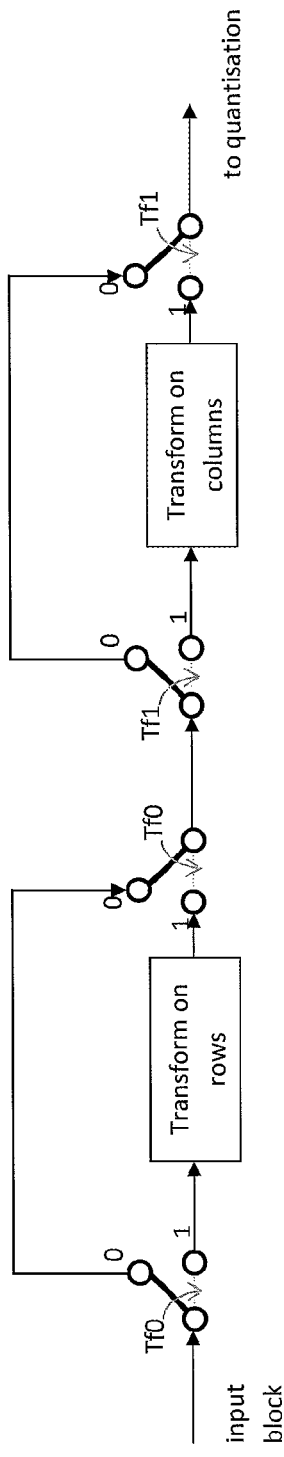
Figure 1: Encoder
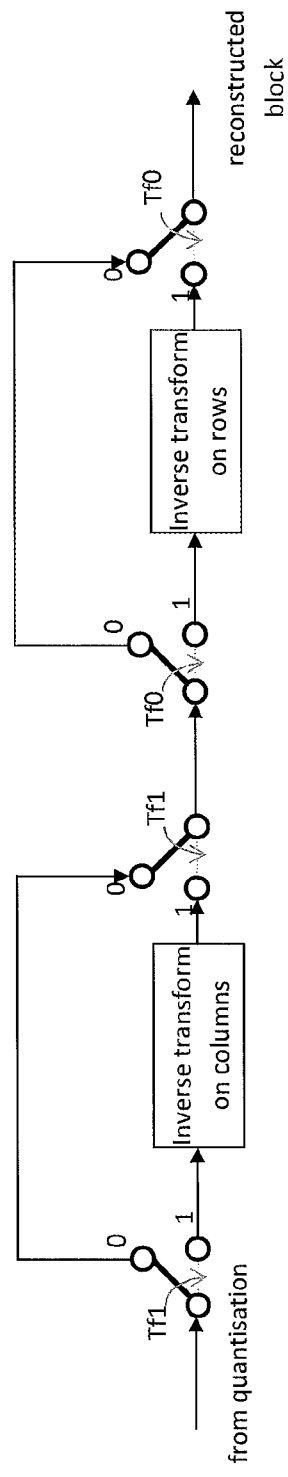
Figure 2: Decoder

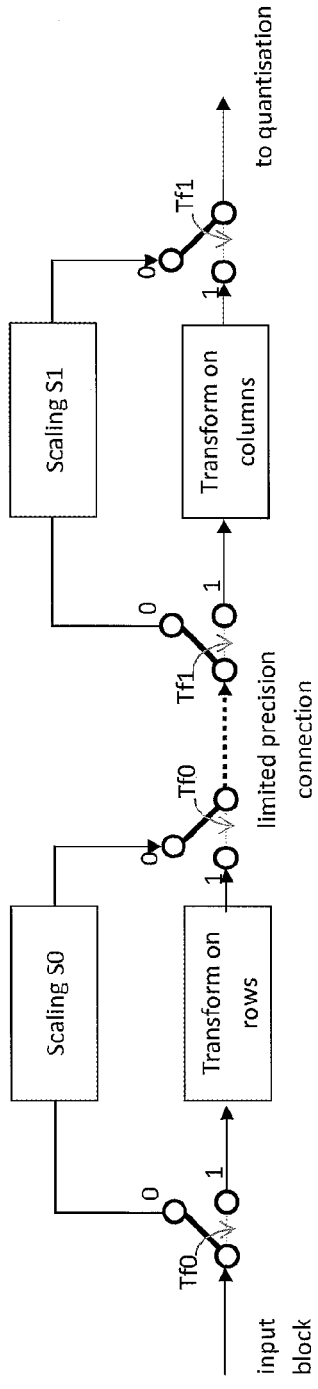
Figure 5: Encoder
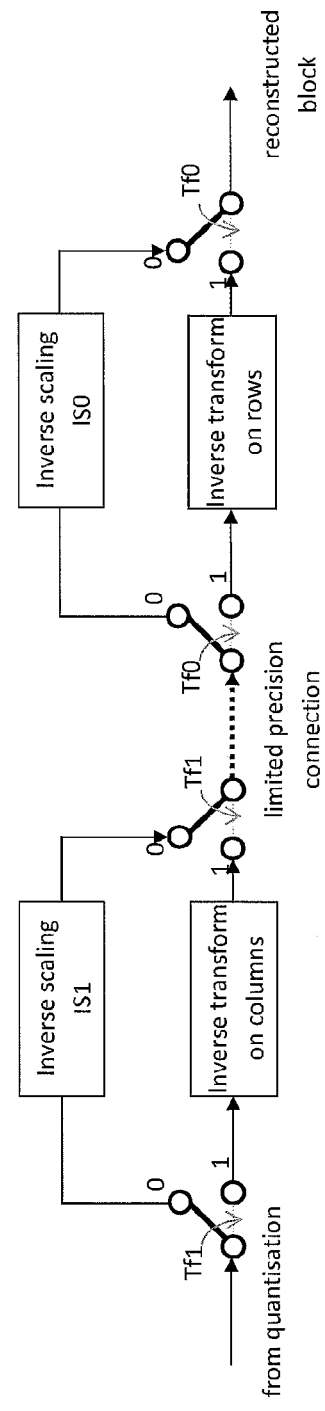
Figure 6: Decoder

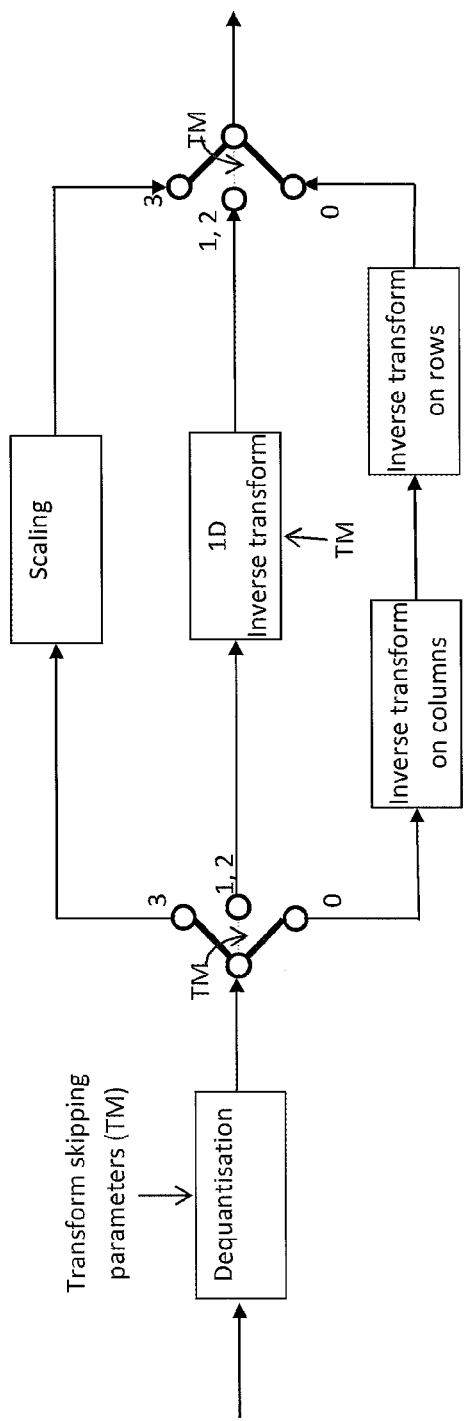
Figure 7 Decoder

VIDEO ENCODING AND DECODING USING TRANSFORMS

FIELD OF THE INVENTION

This invention is related to video compression and decompression systems, and in particular to a framework to adaptively model signal representation between prediction and entropy coding, by the adaptive use of transform functions and related tools, including scaling, quantisation, scanning, and signalling.

BACKGROUND OF THE INVENTION

Transmission and storage of video sequences are employed in several applications like e.g. TV broadcasts, internet video streaming services and video conferencing.

Video sequences in a raw format require a very large amount of data to be represented, as each second of a sequence may consist of tens of individual frames and each frame is represented by typically at least 8 bit per pixel, with each frame requiring several hundreds or thousands of pixels. In order to minimise the transmission and storage costs video compression is used on the raw video data. The aim is to represent the original information with as little capacity as possible, i.e., with as few bits as possible. The reduction of the capacity needed to represent a video sequence will affect the video quality of the compressed sequence, i.e. its similarity to the original uncompressed video sequence.

State-of-the-art video encoders, such as AVC/H.264, utilise four main processes to achieve the maximum level of video compression while achieving a desired level of video quality for the compressed video sequence: prediction, transformation, quantisation and entropy coding. The prediction process exploits the temporal and spatial redundancy found in video sequences to greatly reduce the capacity required to represent the data. The mechanism used to predict data is known to both encoder and decoder, thus only an error signal, or residual, must be sent to the decoder to reconstruct the original signal. This process is typically performed on blocks of data (e.g. 8×8 pixels) rather than entire frames. The prediction is typically performed against already reconstructed frames or blocks of reconstructed pixels belonging to the same frame.

The transformation process aims to exploit the correlation present in the residual signals. It does so by concentrating the energy of the signal into few coefficients. Thus the transform coefficients typically require fewer bits to be represented than the pixels of the residual. H.264 uses 4×4 and 8×8 integer type transforms based on the Discrete Cosine Transform (DCT).

The capacity required to represent the data in output of the transformation process may still be too high for many applications. Moreover, it is not possible to modify the transformation process in order to achieve the desired level of capacity for the compressed signal. The quantisation process takes care of that, by allowing a further reduction of the capacity needed to represent the signal. It should be noted that this process is destructive, i.e. the reconstructed sequence will look different to the original The entropy coding process takes all the non-zero quantised transform coefficients and processes them to be efficiently represented into a stream of bits. This requires reading, or scanning, the transform coefficients in a certain order to minimise the capacity required to represent the compressed video sequence.

The above description applies to a video encoder; a video decoder will perform all of the above processes in roughly reverse order. In particular, the transformation process on the decoder side will require the use of the inverse of the transform being used on the encoder. Similarly, entropy coding becomes entropy decoding and the quantisation process becomes inverse scaling. The prediction process is typically performed in the same exact fashion on both encoder and decoder.

The present invention relates to the transformation part of the coding, thus a more thorough review of the transform process is presented here.

The statistical properties of the residual affect the ability of the transform (i.e. DCT) to compress the energy of the input signal in a small number of coefficients. The residual shows very different statistical properties depending on the quality of the prediction and whether the prediction exploits spatial or temporal redundancy. Other factors affecting the quality of the prediction are the size of the blocks being used and the spatial/temporal characteristics of the sequence being processed.

It is well known that the DCT approaches maximum energy compaction performance for highly correlated Markov-I signals. DCT's energy compaction performance starts dropping as the signal correlation becomes weaker. For instance, it is possible to show how the Discrete Sine Transform (DST) can outperform the DCT for input signals with lower adjacent correlation characteristics.

The DCT and DST in image and video coding are normally used on blocks, i.e. 2D signals; this means that a one dimensional transform is first performed in one direction (e.g., horizontal) followed by a one dimensional transform performed in the other direction. As already mentioned the energy compaction ability of a transform is dependent on the statistics of the input signal. It is possible, and indeed it is also common under some circumstances, for the two-dimensional signal input to the transform to display different statistics along the two vertical and horizontal axes. In this case it would be desirable to choose the best performing transform on each axis. A similar approach has already been attempted within the new ISO and ITU video coding standard under development, High Efficiency Video Coding (HEVC). In particular, a combination of two one dimensional separable transforms such as a DCT-like [2] and DST [3] has been used in HEVC standard under development.

While previous coding standards based on DCT use a two-dimensional transform (2D DCT), newer solutions apply a combination of DCT and DST to intra predicted blocks, i.e. on blocks that are spatially predicted. It has been shown that DST is a better choice than DCT for transformation of rows, when the directional prediction is from a direction that is closer to horizontal then vertical, and, similarly, is a better choice for transformation of columns when the directional prediction is closer to vertical. In the remaining direction (e.g. on rows, when DST is applied on columns), DCT is used.

For implementation purposes, in video coding it is common to use integer approximations of DCT and DST, which will in rest of this text be simply referred to as DCT and DST. One of solutions for integer DCT-like transform uses 16-bit intermediate data representation and is known as partial butterfly. Its main properties are same (anti)symmetry properties as of DCT, almost orthogonal basis vectors, 16 bit data representation before and after each transform stage, 16 bit multipliers for all internal multiplications and no need for correction of different norms of basis vectors during (de)quantisation.

SUMMARY OF THE INVENTION

In one aspect, the present invention consists in a method of video encoding utilising a row transform operating on rows of a block of image values and having a row transform vector and a column transform operating on columns of the block of image values and having a column transform vector, comprising the steps of establishing a set of transform modes including a skip mode in which one or both of the row transform and the column transform are skipped; selecting one of the said modes; for any block where a transform is skipped, applying a scaling factor to the corresponding image values of that block, where the scaling factor is dependent upon the norm of the transform vector of the skipped transform to bring the untransformed image values to the same level as transformed coefficients; and providing an indication of the selected mode for a decoder.

The present invention also consists in a method of decoding video which has been encoded utilising a row transform operating on rows of a block of image values and having a row transform vector and a column transform operating on columns of the block of image values and having a column transform vector; comprising the steps of receiving an indication of the transform skip mode in which one or both of the row transform and the column transform are skipped; applying inverse transforms in accordance with the mode and applying inverse scaling to any untransformed image values, the scaling factor being dependent upon the norm of the transform vector of the skipped transform.

The same scaling factors may be used for all coefficients in a scaled row or column.

In another aspect, the present invention consists in a method of video encoding utilising a row transform operating on rows of a block of image values and having a row transform vector and a column transform operating on columns of the block of image values and having a column transform vector, comprising the steps of establishing a set of transform modes including a skip mode in which one or both of the row transform and the column transform are skipped; selecting one of the said modes; for any block where a transform is skipped adapting a quantisation stage according to the skipped transform and providing an indication of the selected mode for a decoder.

In this aspect, the present invention also consists in a method of decoding video which has been encoded utilising a row transform operating on rows of a block of image values and having a row transform vector and a column transform operating on columns of the block of image values and having a column transform vector; comprising the steps of receiving an indication of the transform skip mode in which one or both of the row transform and the column transform are skipped; applying inverse transforms in accordance with the mode and applying inverse quantisation adapted according to the skipped transform.

Preferably, a quantisation matrix that has the same values in each column is applied when transform operating on columns is skipped, and a quantisation matrix that has the same values in each row is applied when transform operating on rows is skipped.

In yet another aspect, the present invention consists in a method of video encoding utilising a spatial transform operating on rows and columns of a block, comprising the steps of establishing a set of transform skip modes; selecting one of the said modes; and providing an indication of the selected mode for a decoder; wherein positions of the first and the last coefficients to be encoded/decoded within a block are signalled to the decoder and a scanning of coefficients is performed between said first and last coefficients.

In this aspect, the present invention also consists in a method of decoding video which has been encoded utilising a spatial transform operating on rows and columns of a block, with a set of transform skip modes; comprising the steps of receiving an indication of the transform skip mode; applying inverse transforms in accordance with the mode; receiving an indication of the positions of the first and the last coefficients within a block to be decoded and scanning coefficients between said first and last coefficients A double scan may be performed, where a block of transform coefficients is represented with sub-blocks of coefficients; each sub-block is visited in sub-block level scan, and inside each sub-block a scan is used.

The following preferred features are relevant to each of the aspects of the invention set forth above.

The set of transform skip modes may comprise the two modes of: transform on rows and columns; and no transform. Alternatively, the set of transform skip modes may comprise the four modes of: transform on rows and columns; transform on rows only; transform on columns only; and no transform.

Mode selection may be signalled to a decoder with each mode assigned a codeword. The same transform skip mode may be used on all components (luminance—Y and chrominance—U and V) of a YUV block. The transform skip mode may be signalled for all components YUV of a block, for one group of blocks, and is signalled separately for each component for other group of blocks. Thus in HEVC it may be useful to have joint YUV mode signaling for INTER coded blocks, and separate TSM mode for each component for INTRA coded blocks.

The transform skip mode may not need to be signalled for blocks having only zero-value coefficients. It may not need to be signalled when the luminance component has only zero values; in this case 2D transform is used on chroma components. It may not need to be signalled when the only non-zero-value coefficient of the luminance component is the top-left corner of the block (DC component) in this case 2D transform is used on chroma components. The transform skip mode may be signalled only for blocks with predefined other modes (e.g. predicted from other frames only).

In some examples, the order in which coefficients within a block are scanned in the entropy coding stage may be adapted in accordance with the transform skip mode. Thus, row-by-row scanning may be employed where the row transform is skipped and transform of columns is kept, and column-by-column scanning employed where the column transform is skipped and transform on rows is kept.

DETAILED DESCRIPTION OF THE PRESENT INVENTION

The present invention will now be described by way of example with reference to the accompanying drawings, in which:

FIG. 1 is a block diagram illustrating a feature on an encoder according to an embodiment of the invention;

FIG. 2 is a block diagram illustrating the feature on a decoder according to the embodiment;

FIG. 5 is a block diagram illustrating a feature on an encoder according to a further embodiment of the invention;

FIG. 6 is a block diagram illustrating the feature on a decoder according to the embodiment;

Figure 3:
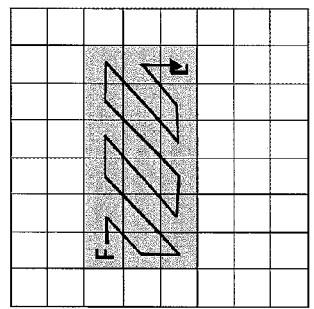
FIG. 3 is a diagram illustrating an alternative to the known zig-zag scanning approach.

FIG. 7 is a block diagram illustrating a feature on a decoder according to a further embodiment of the invention This invention presents a mode to perform the transformation process—Transform Skip Mode (TSM). As described above, the most common transform used in video coding is the DCT. Its energy compacting performance depends on the correlation of the residual. It has also been described how the residual can be highly decorrelated, or correlated in one direction only, making the 2D DCT less efficient. It is proposed to skip the transformation process when the encoder makes such decision in a rate-distortion sense. The selected transform mode must be signalled to the decoder, which then performs a combination of transform/skip transform as defined in signalling.

It is possible to operate with two modes, that is to say a first mode with a 2D transform (comprising the row transform and the column transform) and a second mode with no transforms.

In much of the following description these modes are supplemented with the additional modes formed by skipping just the row transform or just the column transform. Thus, four transform modes are defined as shown in Table 1.

TABLE 1

Transform Skip Mode options

| TSM | Transform on rows | Transform on columns | Note |
|---|---|---|---|
| TS0 | + | + | 2D transform |
| TS1 | + | − | 1D transform |
| TS2 | − | + | 1D transform |
| TS3 | − | − | no transform |

TS0 mode corresponds to 2D transform, i.e. 2D DCT. TS1 mode defines application of one dimensional horizontal DCT followed by a transform skip in the orthogonal direction, i.e. transform of columns is skipped. TS2 defines skipping of horizontal transform, while only columns are transformed. Finally, TS3 mode completely skips transforms in both axes, i.e., no transform is applied to the input signal.

FIGS. 1 and 2 show core transform skip mode block diagrams, for encoder and decoder, respectively. Each transform skip mode is selected with corresponding (Tf0, Tf1) pair of flags, such that TS0: (1, 1), TS1: (1, 0), TS2: (0, 1) and TS3: (0, 0).

As for any other additional bits from a compressed bitstream that enable adaptive option, signalling of the transform skip mode can be costly. Therefore several strategies are devised to maximise the coding efficiency.

Four TSM options can be signalled using carefully designed code words. Those code words do not need to be transmitted for each block, but some other methods can be used to save necessary bit-rate.

Some of possibilities for reducing the signalling cost are listed in the following; each option influencing transform-related parts of the encoder and decoder:
1. The same transform mode used on all components (luminance—Y and chrominance—U and V) of a YUV block; therefore, for Y, U and V collocated blocks only one TSM choice is transmitted.
2. TSM not signalled when all quantised blocks (Y, U and V) have only coefficients with zero values.
3. TSM not signalled for blocks when Y block has only zero-value coefficients, and then 2D DCT is used on U and V components.
4. TSM signalled only for blocks with certain other modes (e.g. bidirectional predicted); otherwise 2D-DCT is applied.
5. Application of TSM signalled on a set of blocks (if "on" then TS modes signalled for each block from the set).
6. TSM signalled on a set of blocks (e.g. all sub-blocks share the same TSM).
7. TSM signalled if certain other block characteristics are present; e.g. TSM not signalled when Y block has only one non-zero value, and that value is in top-left corner of the block (DC component); in that case 2D-DCT is used for all components.

Four TSM modes (2D transform, two 1D block transforms and skipped transform on a block) can be defined with various code words, e.g. with simple 2-bit words, or with more bits (i.e. with unary codes):

| TSM | 2 bit signalling | Unary code |
|---|---|---|
| TS0 | 11 | 1 |
| TS1 | 10 | 01 |
| TS2 | 01 | 001 |
| TS3 | 00 | 000 |

If arithmetic coding is used, each bin of the code word can be encoded with different probability models (i.e. initial context states for each slice), depending on the current block size and on QP value.

On the other hand, if variable length coding is used, TSM code words can be encoded independently of or merged with other syntax elements, to reduce the signalling overhead. In some approaches, a block is not always transformed at once, but rather options for its partitioning into smaller sub-units are applied, and transforms are applied on each sub-units. Representative of such transform structure is Residual QuadTree (RQT) method. While application of TSM on blocks that are not further divided into smaller unit has been assumed so far, TSM can also be applied on such multi-split transform structures. Several options are identified:
1. TSM is decided on a block level, and the same transform choice is applied on each sub-unit.
2. TSM is enabled only at the root level of transformation structure, i.e. when a block is not further partitioned into smaller units when a multi-split structure is enabled; if a block is split into smaller units, each unit is transformed using 2D transform.
3. TSM is decided and signalled for each sub-unit, independently of its depth.
4. TSM is decided and signalled for sub-units, up to specific depth (size) of units; for lower sub-units, when TSB is not signalled, 2D transform is used.

Coefficients within a block can have different characteristics when the transform is not performed in one or both directions. Therefore different coding strategies can be applied, depending on the transform skip mode, to better compress given coefficients.

When a 2D transform is applied on a block, the resulting coefficients are often grouped towards top-left corner of a block, that is to say they are low-frequency components. Conventional scanning, e.g. zig-zag scanning, is therefore a good choice for coding of such signals.

If only 1D transform is applied (TS1 or TS2), adaptive scanning can be used. For example, a row-by-row, or a column-by-column scanning can be used for TS2 and TS1 cases respectively, since one can expect that applied transform concentrates the coefficients towards lower frequencies.

For the TS3 case, where a transform is not applied in any direction, a conventional scan (used for 2D transformed block) scan may be used. Alternatively, a different scanning pattern may be employed which takes into account the probability (implicit in the decision to conduct no transform) that non-zero coefficients are not uniformly distributed. For example, coefficients may be grouped in "islands" surrounded by "seas" of zero coefficients.

Thus, in one new arrangement, positions of the first and the last significant coefficients within a block can be transmitted in the bit-stream, and a conventional scanning of coefficients within a block can then be performed. This is shown in FIG. 3 where white squares represent coefficients that are not encoded and have zero value, gray squares represent coefficients that will be encoded, i.e. include significant (non-zero) coefficients), where the first coded coefficient is labelled with "F" and the last encoded coefficient is labelled with "L". Scanning is performed only on rows and columns that belong to area defined by the first and the last coefficient. In this scanning method, x and y coordinates of the first coefficient must be the same or smaller than the x and y coordinates of the last significant coefficient.

This arrangement should lead to highly efficient coding in the case where non-zero coefficients are clustered, but requires the additional complexity in the encoder of determining the positions of the first and the last significant coefficients within a block, together with the need to signal those positions to the decoder.

Figure 4:
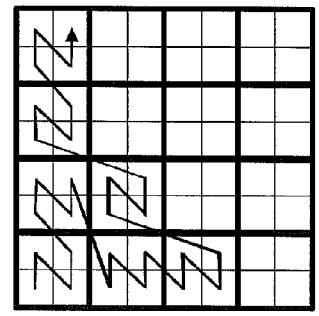
FIG. 4 is a diagram illustrating a further alternative scanning approach.

In an alternative, a double zig-zag scan is used, as depicted in FIG. 4, where a block of transform coefficients is represented with sub-blocks of coefficients. Each sub-block is visited in sub-block level zig-zag scan, and inside each block a zig-zag scan (or any other scan) is used. This enables better grouping of non-zero coefficients, which tend to be spatially close.

It will be desirable, where a decision is taken to skip either or both 1D transforms, to minimise or remove the need to change other elements of the process to accommodate the skipped transform or transforms.

Here, two implementation strategies for the adaptive transform stage are identified:
1) skipping selected transform of rows/columns, and modifying quantisation stage.
2) replacing selected transform of rows/columns by suitable scaling step and adapting the quantisation step if required.

While the first strategy is suitably presented with FIGS. 1 and 2, the second strategy that employs scaling is depicted in FIGS. 5 and 6. One of the main reasons why scaling is performed is to maintain levels of signal, with the highest supported precision, between transform blocks. This is indicated using dashed line in FIGS. 5 and 6.

Scaling is performed by scaling each input pixel value by a factor that is derived from norm-2 of corresponding transform vectors (which would be used to obtain a transform coefficient value, at the same position in a row/column, if the transform was selected). Some transforms have close to orthonormal properties of each vector and this property can further simplify the scaling design since a single value can be used to suitably scale whole row/column on which the transform is skipped.

In the following, scaling strategies are discussed in the context of integer DCT transform with 16 bit intermediate data representation. It will be recognised, however, that this is only an example.

Transforms used in HEVC have the norms ($TN_N$), where N is size of the transform, close to the following numbers:
4-point transform: $TN_4 = 128 = 2^7$; $TNS_4 = 7$;
8-point transform: $TN_8 = 181 = 2^{7.5}$; $TNS_8 = 7.5$;
16-point transform: $TN_{16} = 256 = 2^8$; $TNS_{16} = 8$;
32-point transform: $TN_{32} = 362 = 2^{8.5}$; $TNS_{32} = 8.5$;

where TNS is corresponding Transform Norm Shift parameter (power of 2 represented by left bit-shifting). Note that in HEVC each transform vector may have slightly different norm, but these numbers are good approximations for practical implementations. This fact is also reflected in the designs of quantisation and in the transform level adjustment to preserve 16-bit intermediate data representation. For example, in HEVC decoder design, 16-bit value enters inverse transform. In order to reach 16-bit precision between column (1st stage inverse) and row (2nd stage inverse) transforms, and 9+DB precision after the row transform, the following signal level bit-shifts occur (considering N×N block size):

$$SHIFT = TNS_N - SHIFT\_INV\_1ST + TNS_N - (SHIFT\_INV\_2ND - DB),$$

where, by the standard, SHIFT_INV_1ST=7 and SHIFT_INV_2ND=12, and DB is the bit-depth increment for processing (e.g. 0 or 2). Internal processing bit-depth is B=8+DB.
Therefore, SHIFT equals:

$$SHIFT = 2 \cdot TNS_N - 19 + DB = 2 \cdot TNS_N - 27 + B.$$

This corresponds to the parameter transform shift used in the HEVC quantisation. This leads to, for the example where 4×4 block is considered (TNS$_4$=7), to $$-SHIFT_4 = 13 - B,$$

i.e. right shift by 13−B.

While this example may be used to address signal level adjustment for TS3, some additional considerations have to be taken into account when the transform is applied in one direction only. That is because $TNS_N$ are not always integer numbers, thus bit-shifting is not the only option for level adjustment. Other options for addressing unified designs for such combinations are addressed in the following text.

Where a transform is replaced with scaling, the adaptive transform stage is designed in a way that it can be interleaved within the integer DCT transform with 16-bit intermediate data representation, i.e. with the goal to replace some of its parts and to be compatible with the rest of the codec that supports original 2D transform. For example, not applying transform can be used on rows in a way which is still compatible with the part of 2D transform that is applied on columns. This means that quantisation applied for 2D transform can also be used with adaptive transform choice.

The forward transform skip is defined for rows and columns separately.

On samples x of rows the transform skip is applied as:

$y = (x \cdot scale + offset)$ right shifted by $S$ bits where:

$S = M - 1 + DB$         (a)

offset=1 left shifted by (S−1) bits
DB=B−8 bit-depth increment for processing
M=log 2(N), where N is row/column size in the number of pixels, and scale is an unsigned integer multiplier.

On columns, the transform skip is applied as in (a) where x are samples of columns, but with:

$S = M + 6$ offset=1 left shifted by (S−1) bits

In this way a bit-width of 16 after each transform stage is ensured, as in the 2D transform. Again, scale factors are designed in a way to be near the norm-2 of related transform vectors (scale$_N^2$=TN$_N^2$=N·64$^2$) and to be an integer number. On samples x of columns the inverse transform skip is applied as $$y=(x\cdot\text{scale}+\text{offset}) \text{ right shifted by } S \text{ bits}$$

where:
S=7
offset=1 left shifted by (S−1) bits
and scale is the same as in the forward skip.
On rows the same transform skip operation is applied, but with:
S=12−DB, where DB is the same as in the forward transform skip.

In order to save unnecessary processing of pixels, where one or both 1D transforms are skipped, scaling can be moved to quantisation. Moreover (for example), if only the vertical transform is kept, it can be adapted, to ensure maximal 16-bit representation of pixels. This enables full use to be made of the available bit width. Therefore, scaling in quantisation has to be adapted not only because of the scaling related to skipped transform but also related to new scaling within a transform.
TSM=TS0 (2D Transform)
Regular 2D transform and corresponding quantisation is used.
TSM—TS1 (1D transform on rows) and TS2 (1D transform on columns)
In both cases the forward transform corresponds to the original transform of rows $$y=(x+\text{offset}) \text{ right shifted by } S \text{ bits}, \qquad (b)$$

where:
x is the original value of residual block, $$S=M-1+DB,$$

offset=1 left shifted by (S−1) bits
and M and DB are the same as in (a).
This ensures 16-bit intermediate data precision.
Quantisation is adapted and takes into account the level at which signal is now.
TSM=TS3 (No Transform)
Residual pixels are directly quantised using the flat matrix so that the level of signal corresponds to the levels of quantised coefficients that are 2D transformed and quantised.
Another example of how the level of the signal can be adjusted when a transform is skipped is presented in the following, with reference to FIG. 7. In this example the aim is to reduce a number of operations required to achieve desired performance. In that context, where a transform or its parts can be skipped or replaced, this technique uses a combination of one or more basic operations:
1. Changes to bit-shifting within transform stages;
2. Adjustment of quantisation that correspond to the scaling a signal by a factor smaller than 2;
3. Replacement of the transform or its parts by a scalar outside the quantisation.

Each scaling of the signal can be represented by scaling by a factor of $2^N$ (where N is a positive integer) and by scaling by a factor M that is smaller than 2. Note that in this case N is the transform size as in the previous example). In this invention, Operation 1 enables signal scaling by a factor of $2^N$ (bit-shifting) and Operation 2 enables scaling by M. The choice of M is typically limited and depends on the quantisation design. A typical component of a 1D transform in video coding is bit-shifting. Therefore Operation 1 applied here readily enables adjustment of a signal level by a factor of $2^N$. In the case where both transforms are skipped, adjustment of the level of the signal can be performed in the "Scaling" block from FIG. 7, which corresponds to Operation 3. In any case, adjustment of the signal by a factor smaller than 2, a quantisation parameter offset, or quantisation scaling factor, can be suitably chosen to perform required signal level adjustment. For example, in High Efficiency Video Coding (HEVC), adding an offset of 3 to a quantisation parameter is equivalent to adjusting the level of the signal by sqrt(2) (root 2).

It will be understood that the invention has been described by way of example only and that a wide variety of modifications are possible without departing from the scope of the invention as set forth in the appended claims. Features which are here described in certain combinations may find useful application in other combinations beyond those specifically mentioned and may in certain cases be used alone. For example, the scanning approaches in video coding or decoding where:
positions of the first and the last coefficients to be encoded/decoded within a block are signalled to the decoder and a scanning of coefficients is performed between said first and the last coefficients; or
a double scan is performed, where a block of transform coefficients is represented with sub-blocks of coefficients; each sub-block is visited in sub-block level zig-zag scan, and inside each sub-block additional scan pattern is used;
may be useful beyond the case of transform skip mode.

Whilst aspects of this invention have been illustrated with four transform skip modes, it will as noted above be possible in certain applications to operate with only two of those modes.0

The invention claimed is:

1. A method of video encoding in a processor utilizing a row transform operating on rows of a block of image values and having a row transform vector and a column transform operating on columns of the block of image values and having a column transform vector, comprising the steps of:
establishing a set of transform modes including a skip mode in which one or both of the row transform and the column transform are skipped;
selecting one of the said modes;
for any block where a transform is skipped, applying a scaling factor to the corresponding image values of that block, where the scaling factor is dependent upon the norm-2 of the transform vector of the skipped transform to bring the untransformed image values to the same level as transformed coefficients; and
providing an indication of the selected mode for a decoder.

2. A method according to claim 1, wherein mode selection is signalled to a decoder with each mode assigned a codeword.

3. A method according to claim 1, where the order in which coefficients within a block are scanned in the entropy coding stage is adapted in accordance with the transform skip mode.

4. A method according to claim 3, wherein row-by-row scanning is employed where the row transform is skipped and transform of columns is kept, and column-by-column scanning is employed where the column transform is skipped and transform on rows is kept.

5. A method according to claim 1 where transform skip mode is signalled for all components YUV of a block, for one group of blocks, and is signalled separately for each component for other group of blocks.

6. A method according to claim 1, wherein the same transform skip mode is used on all components (luminance—Y and chrominance—U and V) of a YUV block.

7. A method according to claim 6, wherein the transform skip mode is not signalled when the luminance component has only zero values; in this case 2D transform is used on chroma components.

8. A method according to claim 6, wherein the transform skip mode is not signalled when the only non-zero-value coefficient of the luminance component is the top-left corner of the block (DC component) in this case 2D transform is used on chroma components.

9. A method according to claim 1, wherein the transform skip mode is not signalled for blocks having only zero-value coefficients.

10. A method according to claim 1, wherein the transform skip mode is signalled only for blocks with predefined other modes.

11. A method according to claim 1, wherein the transform skip mode is signalled on a set of blocks.

12. A method of decoding in a processor video which has been encoded utilizing a row transform operating on rows of a block of image values and having a row transform vector and a column transform operating on columns of the block of image values and having a column transform vector; comprising the steps of:
receiving an indication of the transform skip mode in which one or both of the row transform and the column transform are skipped;
applying inverse transforms in accordance with the mode; and
applying inverse scaling to any untransformed image values, the scaling factor being dependent upon the norm-2 of the transform vector of the skipped transform.

13. A method according to claim 12, wherein the same scaling factors are used for all coefficients in scaled row or column.

14. A method according to claim 12, wherein a double scan is performed, where a block of transform coefficients is represented with sub-blocks of coefficients; each sub-block is visited in sub-block level scan, and inside each sub-block a scan is used.

15. A method according to claim 12, wherein the set of transform skip modes comprises:
transform on rows and columns;
no transform.

16. A method according to claim 12, wherein the set of transform skip modes comprises:
transform on rows and columns;
transform on rows only;
transform on columns only;
no transform.

17. A video decoder for decoding video which has been encoded utilizing a row transform operating on rows of a block of image values and having a row transform vector and a column transform operating on columns of the block of image values and having a column transform vector; wherein the decoder is adapted to receive an indication of a transform skip mode in which one or both of the row transform and the column transform are skipped, the decoder comprising an inverse transform unit for applying inverse transforms in accordance with the mode and being adapted to apply inverse scaling to any untransformed image values, the scaling factor being dependent upon the norm-2 of the transform vector of the skipped transform.

* * * * *